United States Patent [19]
Stinson

[11] Patent Number: 5,918,781
[45] Date of Patent: Jul. 6, 1999

[54] APPARATUS HAVING ATTACHED MOVABLE ELEMENT FOR DISPENSING A LIMITED QUANTITY OF A CONTAINED SUBSTANCE

[75] Inventor: Brian D. Stinson, Cumming, Ga.

[73] Assignee: AS-Tech Engineering Company, Norcross, Ga.

[21] Appl. No.: 08/886,181

[22] Filed: Jul. 1, 1997

[51] Int. Cl.[6] ............................ G01F 11/12; G01F 11/26
[52] U.S. Cl. .......................................... 222/454; 222/450
[58] Field of Search .................................. 222/425, 450, 222/454, 456, 500, 584

[56] References Cited

U.S. PATENT DOCUMENTS

| | | | |
|---|---|---|---|
| 1,039,592 | 9/1912 | Ray | 222/454 X |
| 2,007,049 | 7/1935 | Hellmann | 222/450 |
| 2,048,101 | 7/1936 | Butler | 222/584 |
| 2,149,989 | 3/1939 | Ashley | 222/454 X |
| 2,760,693 | 8/1956 | Mika | 222/454 |
| 3,844,454 | 10/1974 | Buchtel | 222/500 X |
| 4,159,791 | 7/1979 | Crutcher | 222/454 |
| 4,454,962 | 6/1984 | Greenspan | 221/288 |
| 4,951,839 | 8/1990 | Kong | 222/47 |
| 5,000,353 | 3/1991 | Kostanecki et al. | 222/456 X |
| 5,065,923 | 11/1991 | Hoefer et al. | 220/694 |

FOREIGN PATENT DOCUMENTS

| | | | |
|---|---|---|---|
| 2304061 | 10/1976 | France | 222/456 |
| 385918 | 1/1922 | Germany | 222/456 |
| 466780 | 11/1951 | Italy | 222/584 |
| 18699 | 9/1898 | United Kingdom | 222/454 |

*Primary Examiner*—Kevin P. Shaver
*Attorney, Agent, or Firm*—Law Office of Jon M. Jurgovan

[57] ABSTRACT

The invented apparatus contains and dispenses limited quantities of a substance. In a first embodiment, the apparatus includes a container with storage and dispenser portions, a partition, and a member. The partition is positioned in the container and tethered to the container's inside wall by the member. If the apparatus is tipped from its normal upright position with its cover in place, the partition moves away from the top of the container's storage portion to allow the substance to move from the storage portion to the dispenser portion. If the apparatus is returned to its upright position, the partition returns to a position covering the storage portion that blocks the substance in the dispenser portion from returning to the storage portion. The cover can be removed from the container to allow use of the substance contained in the dispenser portion. In a second embodiment, the apparatus includes a container, a partition and a flap. The partition is fixed to the inside surface of the container, and defines an opening. The flap is attached to the partition, and covers the opening if the apparatus is in its normal upright position. If the apparatus is tipped sufficiently from its upright position, the flap moves to uncover the partition's opening and allows the substance to move from the storage portion to the dispenser portion. If the apparatus is returned to its upright position, the flap closes the partition's opening and prevents the substance in the dispenser portion from returning to the storage portion.

28 Claims, 8 Drawing Sheets

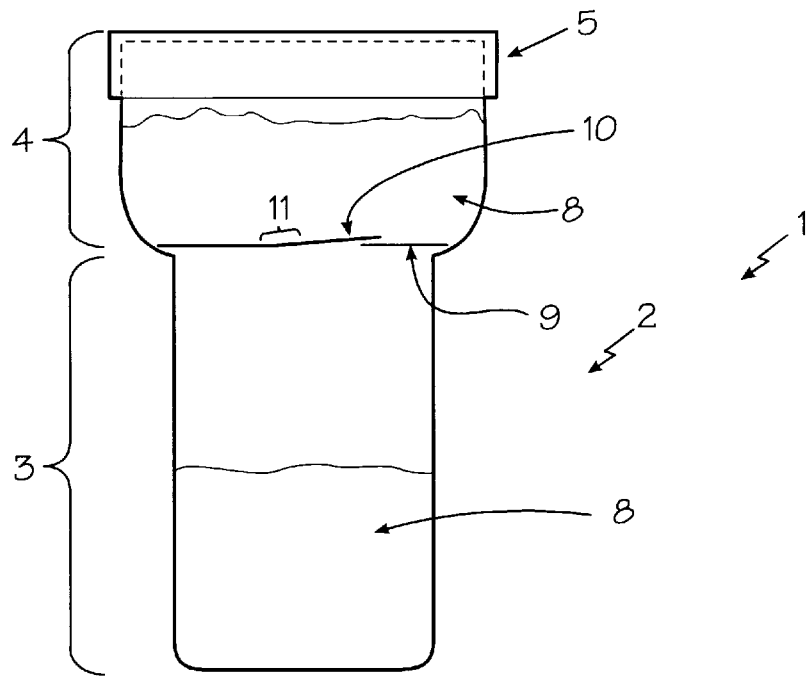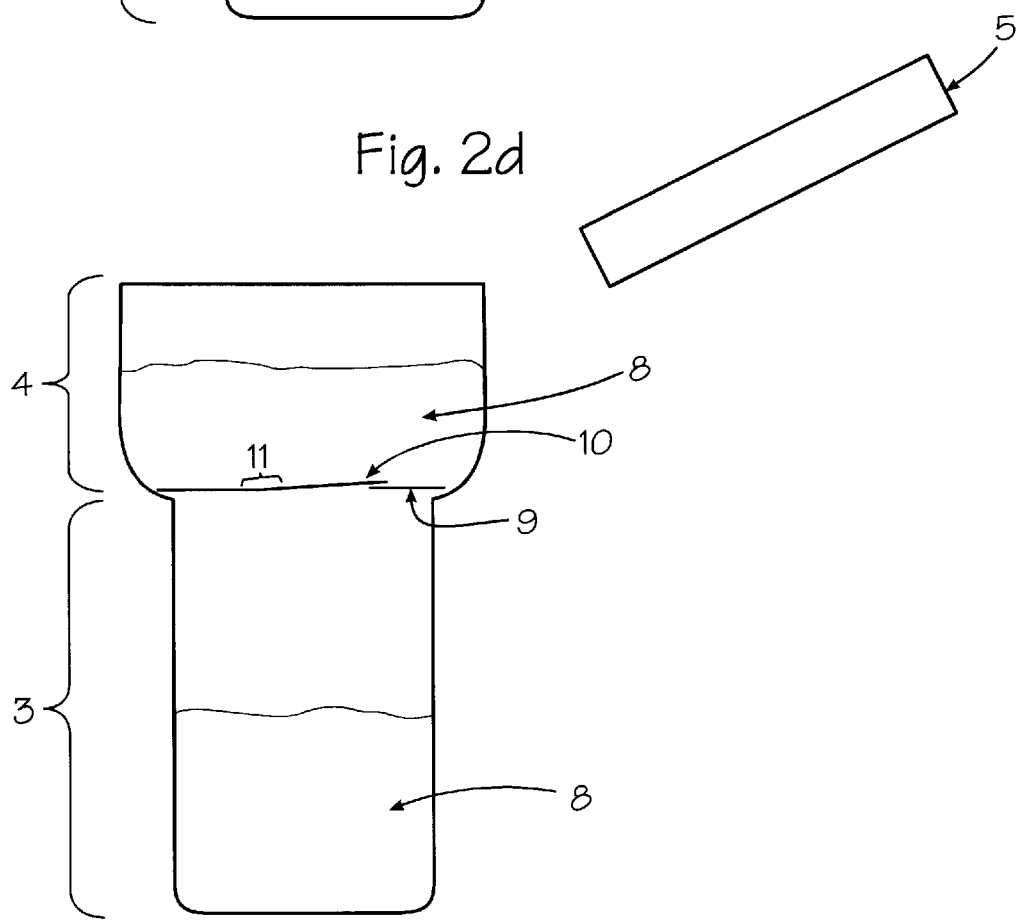

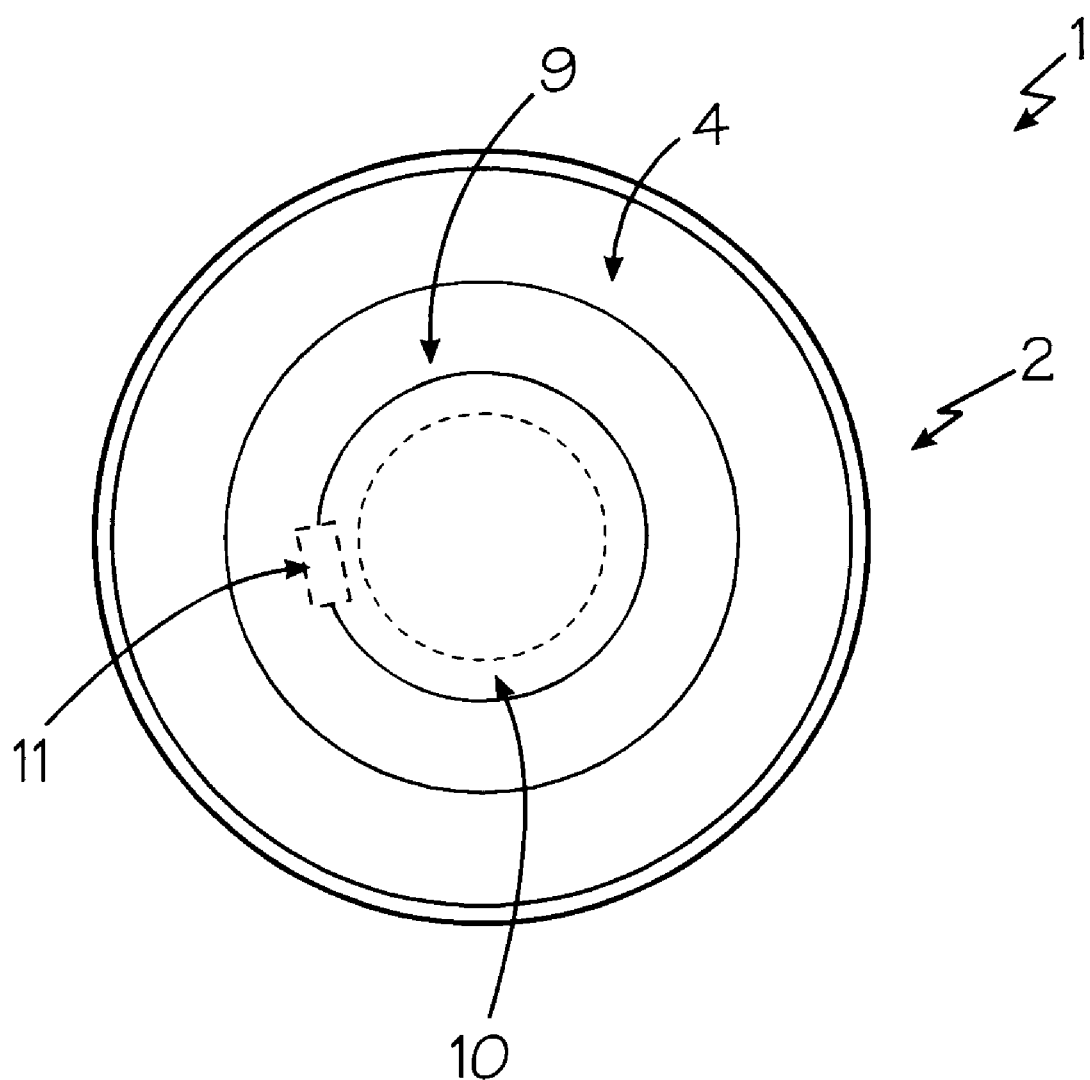

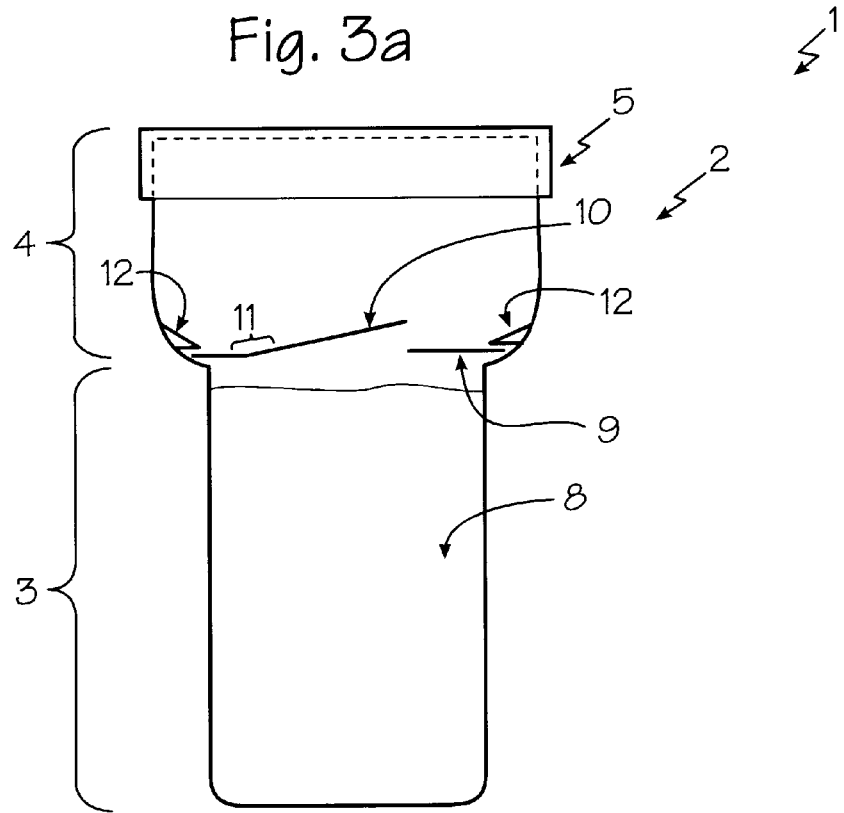
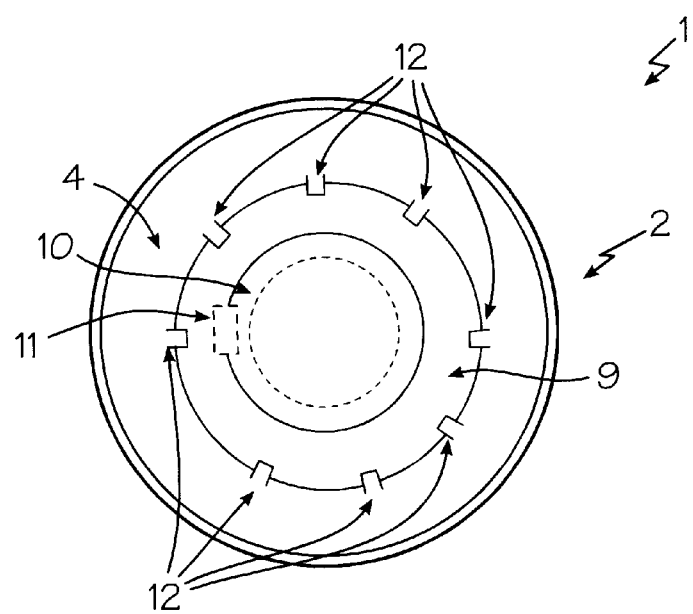

APPARATUS HAVING ATTACHED MOVABLE ELEMENT FOR DISPENSING A LIMITED QUANTITY OF A CONTAINED SUBSTANCE

BACKGROUND OF THE INVENTION

1. Field of the Invention

This invention is directed to a dispenser apparatus that contains and dispenses a limited amount of a substance for use. The substance can be a powdered or granulated material such as sugar, salt or other foodstuff, or other substances such as laundry detergent, soap, or the like. The contained substance can also include salsa, relish or other condiment that is dispensed in a limited quantity to preserve the freshness of the undispensed portion of the substance.

2. Description of the Related Art

U.S. Pat. No. 4,159,791 (referred to hereinafter as "the '791 patent") discloses several embodiments of a container for measuring and dispensing a granulated or powdered substance such as instant coffee, tea, sugar or other substances. Each container has a top that holds or retains a seal. A cup is attached to the seal with its open side facing the inside surface of the top. When the container is closed with the top, the seal forms an airtight bond between the container top and base. To measure and dispense the contained substance, the top is placed on the container, and the container is tipped upside down. The substance flows through openings into the cup. When the container is tipped upright again, the cup contains a measured amount of the substance. The top can be removed from the container and tipped to empty the cup's contents.

Although the '791 patent is meritorious to an extent in dispensing a limited amount of certain types of substances, the '791 patent's container is not suitable for dispensing limited amounts of substances such as salsa, relish or other dips or condiments, because the cup is attached to the container top, thus making it impossible for a person to dip into the cup. In addition, the cup must have openings that allow the contained substance to move into the cup upon tipping the container. Such openings necessarily limit the size of the cup and thus the amount of substance it can contain. It would be desirable to overcome these disadvantages of the apparatus of the '791 patent.

U.S. Pat. No. 5,065,923 (referred to as "the '923 patent") discloses a dip dispenser that includes a serving element that fits inside a container body and cap. The serving element has a support rim that is attached to a food-support bowl by spaced arm elements. The bowl is concave with respect to the cap when placed on the container body. When the container is tipped upside down and shaken with the cap in place, the contained dip flows through gaps defined between the support rim, the bowl, and the arm elements to rest against the cap. When returned to its upright position, the dip falls from the cap to the bowl where it is contained. The cap is then removed to serve the dip.

Although the '923 patent purports to provide the advantage of dispensing limited quantities of a dip, the '923 patent also suffers from several disadvantages. Like the '791 patent, the '923 patent depends for its operability on openings in the serving element that limit the size of the serving element's bowl and thus the amount of dip that can be held by the bowl. Therefore, to be capable of dispensing a given amount of dip, the container size must be relatively large to allow the serving element to fit inside of the container. In addition, the openings in the serving element allow ambient air to interact with the contained substance that is not dispensed in the serving element's bowl, thus allowing spoilage of the contained foodstuff. It would be desirable to overcome these disadvantages of previous dispensers.

SUMMARY OF THE INVENTION

This invention overcomes the above-noted disadvantages. Broadly stated, an apparatus in accordance with this invention includes a container that has a dispenser portion and a storage portion. The apparatus also includes a cover capable of fitting over the open top of the dispenser portion of the container, to prevent spillage and/or spoilage of the contained substance. The apparatus further includes means situated in the container, that is capable of moving to a first position that allows the contained substance to pass from the storage portion to the dispenser portion if the container is tipped from its normal upright position. The means also moves to a second position that substantially seals the storage portion from the dispenser portion and substantially blocks the substance from returning from the dispenser portion to the storage portion, if the container is returned to its upright position. The invented apparatus thus dispenses a limited amount of substance determined by the size of the dispenser portion, and substantially seals the portion of the substance remaining in the container's storage portion from spoilage or other deterioration in its quality. The invented dispenser apparatus is thus highly suitable for the containment and dispensation of substances that are usually dispensed in limited amounts, but that can suffer deterioration in quality if the bulk of the substance is exposed to the environment.

Thus, the invented apparatus is highly suited for use with foodstuffs such as salsa or other dips, condiments and other spoilable substances.

In a first embodiment, the invented apparatus includes a container defining a dispenser portion and a storage portion, and a cover capable of fitting over the open top of the dispenser portion. The first embodiment of the apparatus also includes a partition with a size that is greater than the open top of the storage portion, and that fits inside of the container's dispenser portion. The first embodiment also includes a member attached between the container and the partition, that allows limited movement of the partition in the container. More specifically, the member allows sufficient movement of the partition so that, if the container is tipped from its normal upright position, the partition moves a limited distance away from the open top of the storage portion under force of gravity to allow the substance to move from the storage portion to the dispenser portion. On the other hand, if the container is returned to its normal upright position, the member restricts the movement of the partition sufficiently so that the partition returns to a position covering the storage portion's open top and substantially blocks the substance in the dispenser portion from returning to the storage portion of the container. The container's cover can be removed to dispense the substance contained in the dispenser portion of the container.

In a second embodiment, the invented dispenser apparatus includes a container that defines a dispenser portion and a storage portion. The second embodiment of the dispenser apparatus includes a cover capable of fitting over the open top of the dispenser portion. The second embodiment of the apparatus also includes a partition attached to the container to partially close the open top of the storage portion. The partition defines an opening that allows communication between the storage and dispenser portions of the container. The second embodiment of the apparatus also includes a flap attached to the partition. The flap has an open position that allows the storage portion to communicate with the dispenser portion, and a closed position that closes the opening defined in the partition to substantially seal the storage portion from communication with the dispenser portion. If the container is tilted from its normal upright position, the flap assumes the opened position and allows the substance in the storage portion to pass to the dispenser portion. If the container is subsequently returned to its normal upright position, the flap assumes a closed position substantially blocking the substance in the dispenser portion from falling back to the storage portion. The cover is removed after tipping the container, to dispense the substance from the dispenser portion of the container.

These together with other features and advantages, which will become subsequently apparent, reside in the details of construction and operation as more fully hereinafter described and claimed, reference being made to the accompanying drawings, forming a part hereof, wherein like numerals refer to like parts throughout the several views.

BRIEF DESCRIPTION OF THE DRAWINGS

FIGS. 2A–2D are side cross-sectional views of a second embodiment of a dispenser apparatus in accordance with this invention, and its method of use, and FIG. 2E is a top plan view of the second embodiment of the dispenser apparatus;

FIG. 3A is a side cross-sectional view of variation of the second embodiment of the dispenser, and FIG. 3B is a top plan view of the second embodiment of the dispenser.

DESCRIPTION OF THE PREFERRED EMBODIMENTS

Figure 1A:
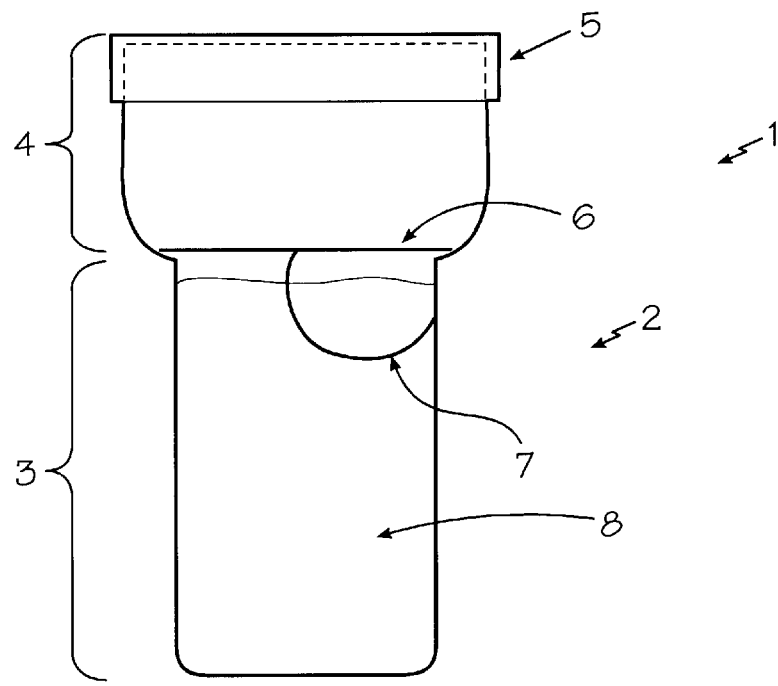
FIGS. 1A–1D are side cross-sectional views of a first embodiment of a dispenser apparatus in accordance with this invention, and its method of use.

In FIGS. 1A–1E, a first embodiment of the invented dispenser apparatus 1 is shown. Referring now to FIG. 1A, the apparatus includes a container 2 that has a storage portion 3 and a dispenser portion 4. The container serves to hold a substance that is capable of flowing, such as a granulated or powdered material, a relatively viscous liquid, or diced or chopped food matter, for example. Thus, the substance can be foodstuff such as powdered or granulated sugar, salt, coffee, tea or drink mix, for example. The container is also highly suitable for diced or chopped foods such as salsa or relish, or viscous material such as ketchup, mustard, mayonnaise, or other condiment. In addition, the container can be used to contain and dispense limited amounts of non-foodstuffs, such as laundry detergent, soap and the like.

The storage portion of the container serves to contain the substance that is not yet dispensed. The storage portion defines an open top that can communicate with the lower portion of the container's dispenser portion. In the preferred configuration, the dispenser portion preferably has a greater diameter than the storage portion. More specifically, if the apparatus is used to dispense dips or the like, the dispenser portion can be formed with a bowl-like configuration to allow sufficient hand-space for a person to dip a chip or cracker, for example, into the dispenser portion. However, the container and its storage and dispenser portions can assume other shapes and various sizes without departing from the scope of this invention.

The apparatus also includes a cover 5 that can be removably secured or fitted to the open top of the dispenser portion 4 to close the container. The cover is preferably fitted in a substantially air-tight manner to the dispenser portion, particularly if the contained substance is a foodstuff or other spoilable material, or material that could be damaged or destroyed by exposure to the atmosphere. The cover can define threads that mate with respective threads defined on the upper outside surface of the dispenser portion, i.e., a screw-on/screw-off top configuration. Alternatively, the cover and rim of the dispenser portion can be configured so that the cover secures in place to the dispenser portion's rim if the cover is pressed over the rim. These and other devices and techniques, conventionally known or developed in the future, can be used to secure the cover to the container.

Inside the container, a partition 6 is situated. The partition is substantially rigid, and sufficiently large in extent to enclose the open top of the storage portion of the container if the container is positioned in its normal upright position as shown in FIG. 1A. The partition is also preferably sufficiently small in extent that it readily fits inside of the container's dispenser portion. If the storage portion is substantially cylindrical, the partition preferably has a circular shape that fits over the circular open top of the storage portion. Preferably, the inner wall of the dispenser portion narrows in a direction toward the top of the storage portion so that partition's edge restrains the partition from moving into the storage portion of the container. The narrowed bottom surface of the dispenser portion thus confines the movement of the partition to the container's dispenser portion. In addition, the inner surfaces of the bottom portion of the dispenser portion 4 are preferably curved or sloped, as shown in FIG. 1A, to guide the edge of the partition toward a position that is centered over the top of the storage portion.

The apparatus also includes a member 7 that is attached between the container and the partition. The member serves to limit the movement of the partition in the dispenser portion. Preferably, the member is made of a strip of flexible or resilient material that is attached at its two opposite ends to the partition and the inner wall of the container, respectively. In an alternative configuration, the member 7 can be substantially rigid and pivotally coupled to the partition and the inside wall of the container. Preferably, one end of the member is attached to the container at a location inside the container's storage portion, and the other end is attached to the partition at a central location thereof.

In the preferred configuration, the container 2, the cover 5, and the partition 6 are made of a substantially rigid material, such as relatively rigid plastic material. As is apparent to those of ordinary skill in this technology, the container, cover and partition can be formed from plastic molds. The member 7 preferably is made from plastic material with a relatively thin width so that the member is flexible. Alternatively, the member can be formed from a flexible or resilient material such as relatively soft plastic, or string, filament or other material. The member 7 can be attached to the partition and the inner wall of the apparatus by fusing its ends to the partition and the inner wall of the container with the application of heat and pressure. More specifically, the member can first be fused to the partition through the application of heat and pressure with a heating element (not shown) such as a soldering iron, and the partition and member can be inserted into the container. By tilting the partition, an elongated heating element (not shown) can be extended into the container to fuse the member's end to the container wall. Also, a rapidly curing adhesive can be used to adhere the ends of the member 7 to the partition and the container. More specifically, the adhesive can be applied and cured to adhere the member to the partition. The partition and member can be inserted into the dispenser portion and the partition can be tilted so that the member's opposite end rests against the inner wall of the container. An elongated tool (not shown) with adhesive material on its tip can be used to adhere the member's end to the container wall. As a further alternative, one of the ends of the member can be formed integrally with either the partition or the inner wall of the container with the mold used to make the partition or container, and the loose end of the member can be adhered or fused to the partition or the container's inner wall, as appropriate.

Figure 1B:
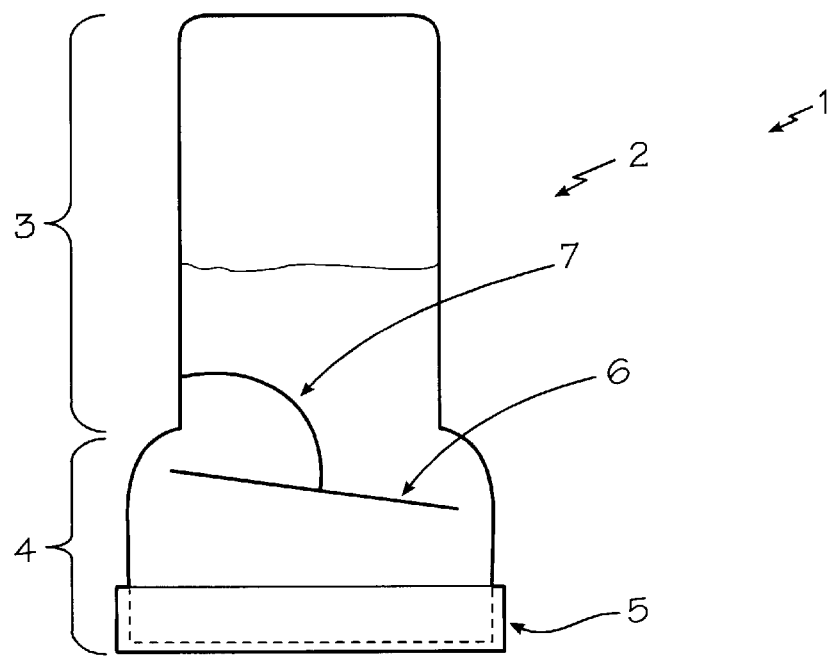
Figure 1C:
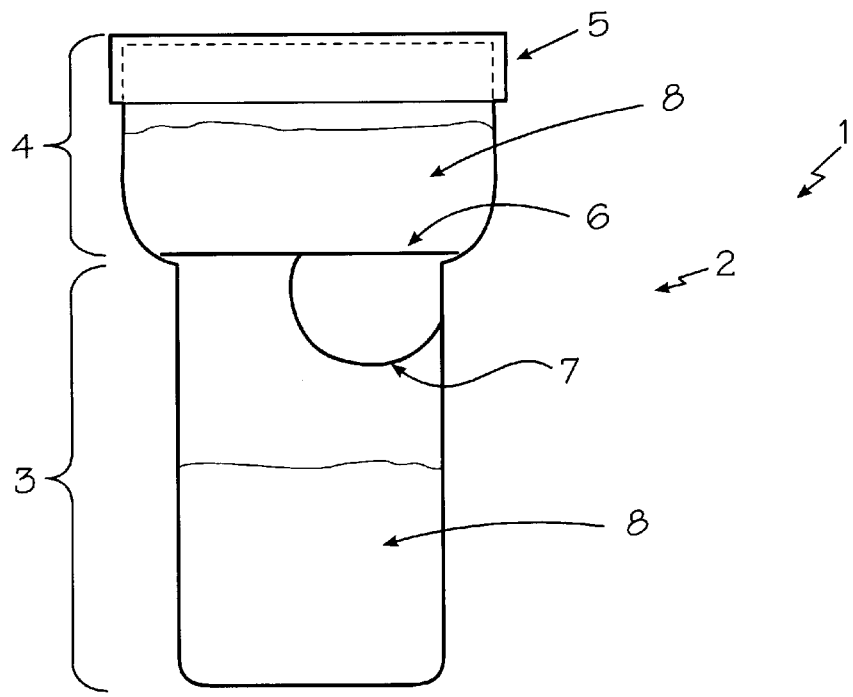
Figure 1D:
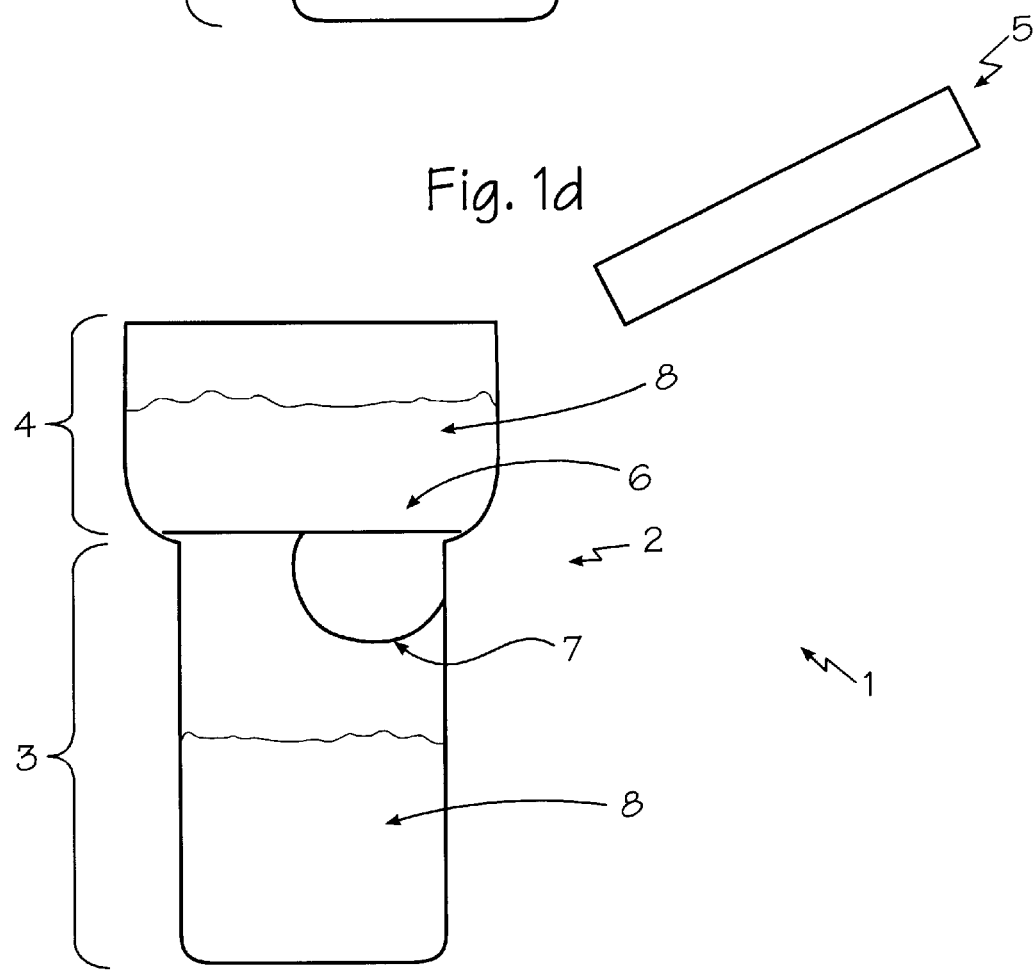

The use of the first embodiment of the invented dispenser apparatus is now described with reference to FIGS. 1A–1D. In FIG. 1A, the substance 8 is contained in the storage portion of the container. In FIG. 1B, the apparatus 1 is tipped by hand from its normal upright position, and preferably inverted. Under its own weight and/or the weight of the contained substance, the partition is forced away from the top of the storage portion 3 so that the substance freely flows into the dispenser portion of the container until it is filled. Due to the presence of the cover 5 on the container, the substance does not spill from the inverted container. In FIG. 1C, the dispenser apparatus 1 is returned to its upright position. The weight of the partition itself and/or the weight of the portion of the substance 8 in the dispenser portion of the container forces the partition to move against and substantially seal the open top of the container's storage portion. In FIG. 1D, the cover 5 is removed by hand from the dispenser apparatus. The substance 8 in the dispenser portion can thus be used. For example, if the substance is a dip, a person can insert a cracker or chip, etc. through the open top of the dispenser portion 4 to apply dip to the cracker or chip.

Figure 1E:
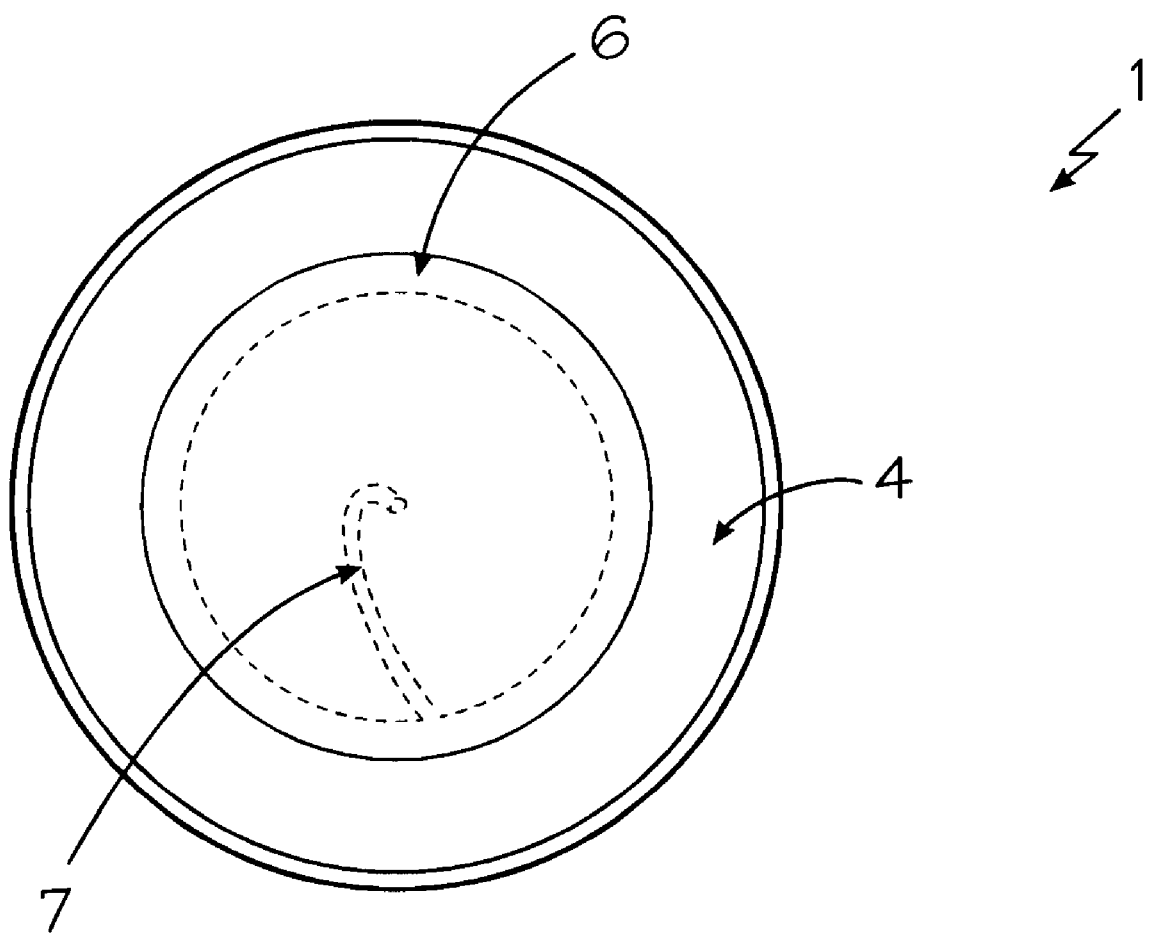
FIG. 1E is a top plan view of the dispenser apparatus.

FIG. 1E is a top plan view showing a preferred configuration of the first embodiment of the dispenser apparatus in its upright condition with the cover 5 removed and no substance present in the dispenser portion. The partition 6 is housed inside the dispenser portion 4 to cover the open top of the storage portion 3. Underneath the partition 6 in FIG. 1E, the member 7 is coupled between the partition and the side wall of the container's storage portion.

FIGS. 2A through 2E are views of a second embodiment of the invented dispenser apparatus. In many respects, the second embodiment of the dispenser apparatus is similar to the first embodiment and includes similar components. However, the second embodiment of the dispenser apparatus includes a partition 9 with a peripheral edge that is fixed inside the container 2. The partition can be fixed to the container's inside surface by adhering the edge of the partition to the container with an adhesive material. Alternatively, the edge of the partition 9 can be fused to the inside surface of the container 2 through the selective application of heat with a heating element such as a soldering iron or other heat source, or an energy beam generated by a laser, for example. The partition 9 defines a centrally located opening that allows the storage portion to communicate with the dispenser portion. The second embodiment of the apparatus also includes a flap 10 that is attached to the partition. The flap can have a hinged portion formed integrally with the partition 9, or may include a hinge 11 composed of a flexible piece of material, that is attached between the partition and the flap. The hinge 11 secures the flap to the partition and yet allows the flap to swing about the hinge to cover or uncover the opening defined in the partition.

Figure 2A:
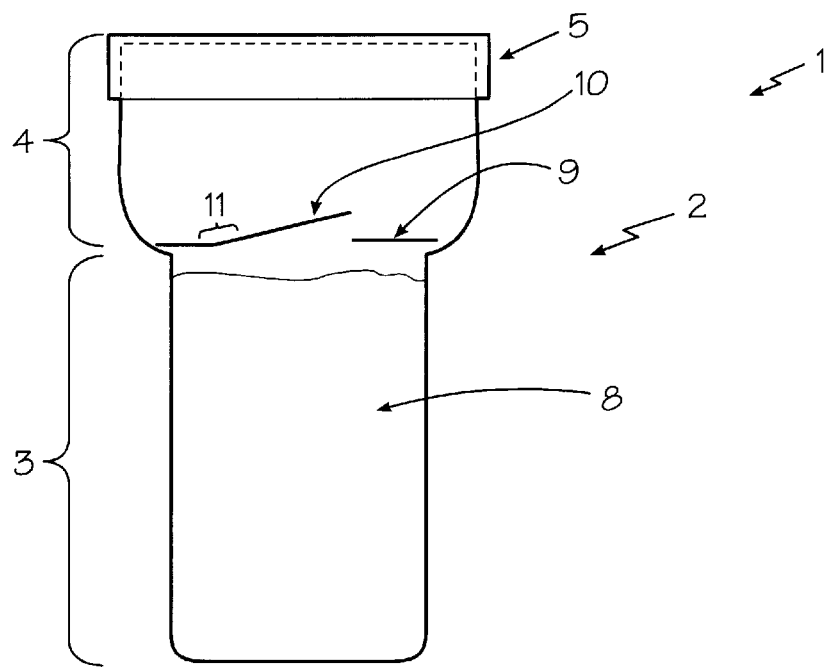
Figure 2B:
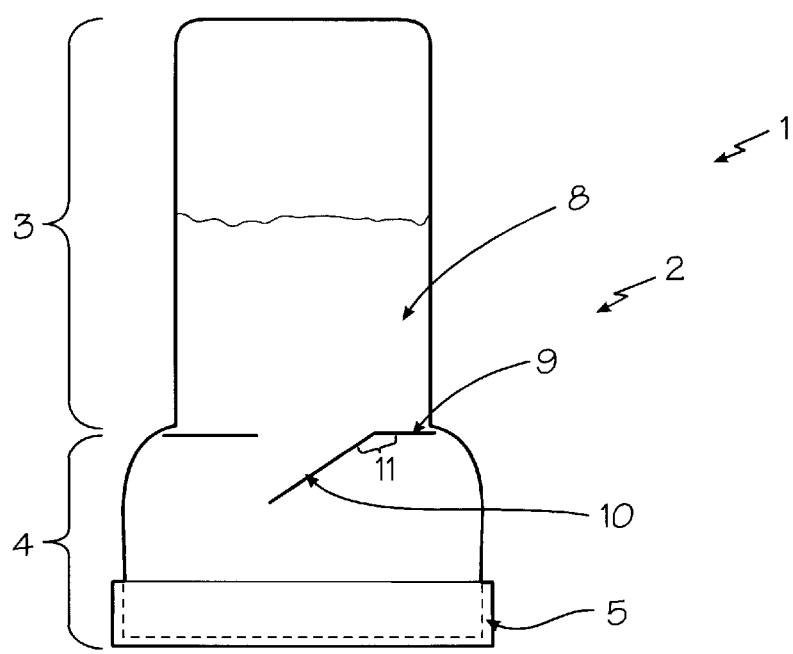

The use of the second embodiment of the apparatus is described with respect to FIGS. 2A through 2D. In FIG. 2A, the substance 8 is positioned in the storage portion of the dispenser apparatus. In FIG. 2B, the container 2 is tipped from its normal upright position, and is preferably inverted. The weight of the flap 10 itself and/or the weight of the substance forces the flap to assume an open position uncovering the partition's opening so that the substance flows from the storage portion to the dispenser portion until the dispenser portion is filled. Due to the presence of the cover 5 on the container, the substance does not spill from the inverted container. In FIG. 2C, the container is returned by hand to its upright position in which the weight of the flap 10 and/or the weight of the substance 8 in the dispenser portion causes the flap to engage with the partition and thus close the partition's opening. In FIG. 2D, the cover 5 is removed by hand to allow the substance in the dispenser portion to be used. For example, if the substance is a dip such as salsa, a chip or cracker can be dipped in the substance contained in the dispenser portion. The seal of the flap to the partition is particularly advantageous if the contained substance is spoilable as the flap and partition will prevent exposure of the unused substance in the storage portion from spoilage or damage by exposure to the environment.

FIG. 2E shows the top plan view of the second embodiment of the dispenser apparatus in its upright position. The partition is joined about its peripheral edge to the inner surface of the dispenser portion 4 of the container 2. The flap 10 covers the opening at the top of the storage portion. The flap can pivot about its hinged portion if the flap is formed integrally with the partition. On the other hand, if the flap is a separate element from the partition 9, the flap can be attached to the partition by the hinge 11 that is adhered or fused between the flap and the partition.

FIGS. 3A and 3B show a variation of the second embodiment of the dispenser apparatus. The variation of the dispenser apparatus in FIG. 3A is similar to that described with respect to FIGS. 2A–2E, but rather than joining the edge of the partition 9 to the container by adhesion or fusion, the apparatus includes stops 12 circularly disposed about the inner surface of the apparatus. The partition is sufficiently resilient to be bent by exerting downward pressure in a middle portion of the top side of the partition in FIG. 3A. The bending of the partition by the applied pressure decreases its diameter sufficiently that it moves past the tips of the stops 12. The stops 12 are preferably angled to guide the partition's edge to the tips of the stops 12. After the partition's edge clears the stops, the pressure on the partition is released so that the partition returns to its substantially planar configuration due to its resiliency. The top side of the partition is thus secured about its edge by the stops 12. The bottom side of the partition is secured by the inner bottom surface of the container's dispenser portion which narrows to a diameter that is less than that of the partition. The use of the variation of the second embodiment of the dispenser apparatus is similar to that described with respect to FIGS. 2A–2D. In FIG. 3B, a top plan view is shown of the variation of the second embodiment of the dispenser apparatus in its upright position. The partition 9 can be seen secured on its top surface by the about its edge by the stops 12 that are preferably formed integrally with the dispenser portion 4. The flap 10 is secured to the partition with a hinged portion formed integrally with the partition, or with a separate hinge 11 that is adhered or fused between the partition 9 and the flap 10.

Figure 4A:
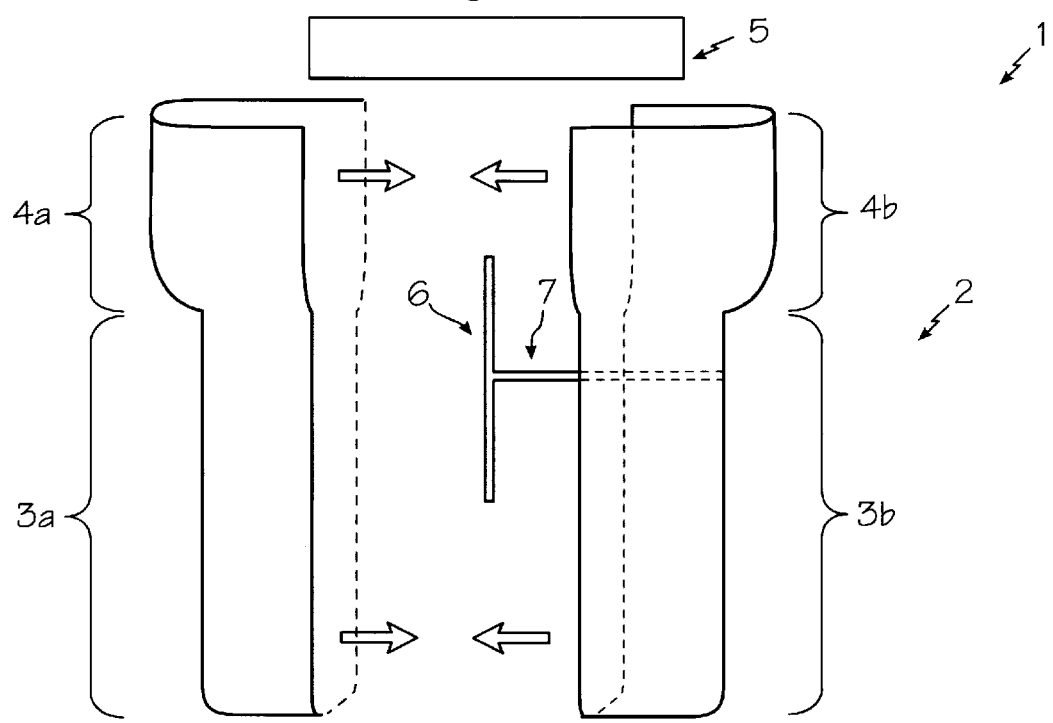
FIGS. 4A and 4B are views of a method for making the dispenser apparatus.
Figure 4B:
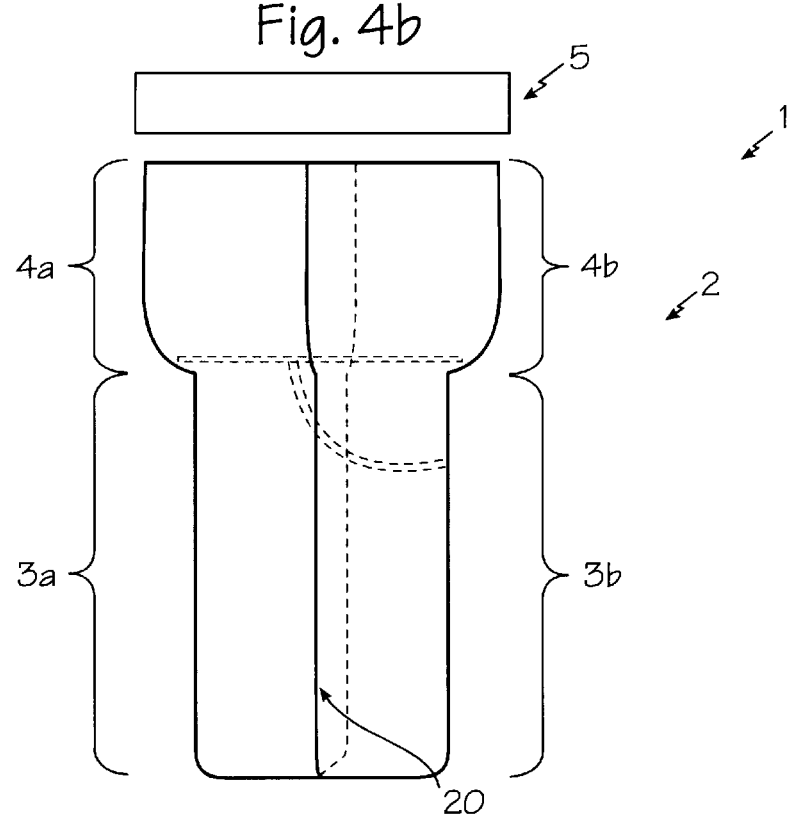

FIGS. 4A and 4B are views of a method for making a dispenser apparatus. In this case, the method is applied to making a dispenser like that of FIGS. 1A–1E. In FIG. 4A, the apparatus 1 is made of molded plastic material, for example, formed in three separate pieces: a first container half including storage and dispenser portions 3a and 4a, a second container half including storage and dispenser portions 3b and 4b with integrally formed flap 6 and member 7, and a cover 5. The flap and member 7 can alternatively be made from separate pieces welded, fused or adhered together and to the wall of one of the container halves. In FIG. 4B, the two container halves are joined together to produce the container 2. The two container halves can be joined together by ultrasonic or thermal welding, adhesive or fusing the respective edges of the two container halves to form joinder line 20. To complete the assembly, the cover 5 can be secured to the top of the dispenser portion 4. The method of FIGS. 4A and 4B can be readily adapted and applied to the manufacture of the container 2 of FIGS. 2A–2E and FIGS. 3A–3B from two separately formed split halves. Further, in FIGS. 2A–2D, the method can be applied to manufacture a portion of the partition 9 and flap 10 integrally with one container half, and the remaining portion of the partition with the other container half. Upon joining the two container halves together, the apparatus configuration of FIG. 2A results.

In FIGS. 1A, 2A and 3A, for convenience of description of the use of the dispenser apparatuses disclosed herein, no substance 8 is shown initially in the container's dispenser portion. However, in preparation for shipment of the containers to markets for consumers, it is preferred that both the storage portion and the dispenser portion be filled with the substance at its manufacturing plant. Upon opening the container, the consumer would first use the portion of the substance in the dispenser portion of the container before refilling the dispenser portion as described in FIGS. 1A–1D for the first embodiment, or FIGS. 2A–2D for the second embodiment of the invented dispenser apparatus.

In the foregoing description, it should be evident that the partition 6 and the member 7 in the first embodiment of the dispenser apparatus, or the flap 10 and its hinged portion or hinge 11 in the second embodiment of the dispenser apparatus, constitute means that move to a first position that allows substance to pass from the storage portion to the dispenser portion if the container is tipped from its normal upright position, and that moves to a second position that substantially seals the storage portion from the dispenser portion and substantially blocks the substance from returning from the dispenser portion to the storage portion if the container is returned to its upright position. Thus, the partition 6 and the member 7, or the flap 10 and its hinged portion or hinge 11, act as a one-way check valve that permits passage of the substance from the storage portion to the dispenser portion of the container, but that prevents the substance from returning from the dispenser portion to the storage portion. In addition, these features of the invention preserve the freshness or quality of the substance contained in the storage portion while dispensing only a measured or limited amount of the substance that is likely to be used relatively quickly. Accordingly, the non-dispensed portion of the substance in the container's storage portion is effectively preserved for later use.

The many features and advantages of the present invention are apparent from the detailed specification and thus, it is intended by the appended claims to cover all such features and advantages of the described apparatus which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

I claim:

1. An apparatus for dispensing a substance, the apparatus comprising:

a container defining a dispenser portion and a storage portion;

a cover capable of fitting over an open top of the dispenser portion;

a partition having a size greater than an open top of the storage portion and fitting inside of the dispenser portion; and a member attached between the container and the partition, that allows limited movement of the partition in the dispenser portion if the container is tipped from its normal upright position.

2. An apparatus as claimed in claim 1, wherein the cover defines threads that engage with corresponding threads at the top of the dispenser portion to secure the cover to the dispenser portion of the container.

3. An apparatus as claimed in claim 1, wherein the cover is placed on the container by pressing the cover onto the dispenser portion.

4. An apparatus as claimed 1, wherein the member is flexible.

5. An apparatus as claimed in claim 1, wherein the member is fused at one end to the container and is fused at its other end to the partition.

6. An apparatus as claimed in claim 1, wherein the member is adhered at one end to the container and adhered at its other end to the partition.

7. An apparatus as claimed in claim 1, wherein at least one of the container, cover, partition, and member include plastic material.

8. An apparatus as claimed in claim 1, wherein the member allows sufficient movement of the partition so that, if the container is tipped from its normal upright position, the partition moves away from the open top of the storage portion under force of gravity to allow the substance to move from the storage portion to the dispenser portion, and the member restricting the movement of the partition sufficiently so that, if the container is returned to its upright position, the partition returns to a position covering the storage portion's open top and substantially blocks the substance in the dispenser portion from returning to the storage portion of the container.

9. An apparatus as claimed in claim 8, wherein the cover is removed after tipping and returning the container to its upright position, to dispense the substance.

10. An apparatus as claimed in claim 1, wherein the dispenser portion has a greater width than that of the storage portion.

11. An apparatus as claimed in claim 10, wherein the dispenser portion is sloped in proximity to the storage portion to guide the partition into position that covers the storage portion's open top if the container is positioned in its upright position.

12. An apparatus for dispensing a substance, the apparatus comprising:

a container defining a dispenser portion and a storage portion;

a cover capable of fitting over an open top of the dispenser portion;

a partition attached to the container to partially close an open top of the storage portion, the partition defining an opening that communicates with the storage portion; and a flap attached to the partition, the flap having an open position that allows the storage portion to communicate with the dispenser portion, and a closed position that closes the opening defined in the partition to substantially seal the storage portion from communication with the dispenser portion.

13. An apparatus as claimed in claim 12, wherein a peripheral edge of the partition is fused to the container.

14. An apparatus as claimed in claim 12, wherein the peripheral edge of the partition is adhered to the container.

15. An apparatus as claimed in claim 12, further comprising:
a plurality of stops positioned circularly about an inner surface of the dispenser portion, the partition secured in the container on one side by the stops, and on its opposite side by a portion of the inner surface of the dispenser portion that has a diameter less than that of the partition.

16. An apparatus as claimed in claim 12, wherein the dispenser portion has a greater width than that of the storage portion.

17. An apparatus as claimed in claim 12, further comprising:
a hinge attached between the flap and the partition, allowing the flap to move between its open and closed positions.

18. An apparatus as claimed in claim 12, wherein the flap includes a hinged portion formed integrally with the partition.

19. An apparatus as claimed in claim 12, wherein, if the container is tilted from its normal upright position, the flap assumes an open position allowing the substance in the storage portion to pass to the dispenser portion, and wherein, if the container is returned to its normal upright position, the flap assumes a closed position substantially blocking the substance in the dispenser portion from falling back to the storage portion.

20. An apparatus as claimed in claim 12, wherein the cover is removed after tipping the container, to dispense the substance.

21. An apparatus as claimed in claim 12, wherein the cover defines threads that engage with corresponding threads at the top of the dispenser portion to secure the cover to the dispenser portion of the container.

22. An apparatus as claimed in claim 12, wherein the cover is fitted to the container by pressing the cover to the dispenser portion.

23. An apparatus as claimed in claim 12, wherein at least one of the container, cover, partition, and flap include plastic material.

24. An apparatus for dispensing a substance, the apparatus comprising:
a container having a dispenser portion and a storage portion, the storage portion containing the substance;
a cover capable of fitting over an open top of the dispenser portion of the container; and
means situated in the container, the means for moving to a first position that allows substance to pass from the storage portion to the dispenser portion if the container is tipped from its normal upright position, and the means for moving to a second position that substantially seals the storage portion from the dispenser portion and substantially blocks the substance from returning from the dispenser portion to the storage portion if the container is returned to its upright position, the means including
a partition having a diameter greater than a portion of the container defining an opening to the storage portion; and
a member attached between the container and the partition, the member allowing the partition to move a limited distance to uncover the storage portion of the container if the container is tipped from its normal upright position, and the member restricting movement of the partition from the storage portion so that the partition covers the storage portion if the container is returned to its normal upright position.

25. An apparatus as claimed in claim 24, wherein inner surfaces of the dispenser portion in proximity to the opening of the container's storage portion are sloped to urge the partition toward a centered position covering the opening of the container's storage portion if the container is situated in its normal upright position.

26. An apparatus for dispensing a substance, the apparatus comprising:
a container having a dispenser portion and a storage portion, the storage portion containing the substance;
a cover capable of fitting over an open top of the dispenser portion of the container; and
means situated in the container, the means for moving to a first position that allows substance to pass from the storage portion to the dispenser portion if the container is tipped from its normal upright position, and the means for moving to a second position that substantially seals the storage portion from the dispenser portion and substantially blocks the substance from returning from the dispenser portion to the storage portion if the container is returned to its upright position, the means including
a partition attached about its periphery to the inner wall of the container to separate the dispenser portion from the storage portion, the partition defining an opening that allows communication between the dispenser and storage portions of the container; and
a flap attached to the partition, the flap having an opened position that uncovers the partition's opening to allow the substance to pass from the storage portion to the dispenser portion if the container is tipped from its normal upright position, and the flap having a closed position that closes the opening to substantially seal the dispenser portion from the storage portion, and to substantially block the substance in the dispenser portion from returning to the storage portion, if the container is returned to its normal upright position.

27. An apparatus as claimed in claim 26, wherein the flap flexes between its opened and closed positions about a hinged portion formed integrally with the partition.

28. An apparatus as claimed in claim 27, wherein the means includes
a hinge coupled between the partition and the flap, that allows the flap to move between its opened and closed positions.

* * * * *